G. W. DOPKINS.
PUMPING MECHANISM.
APPLICATION FILED MAR. 26, 1914.
1,127,742.
Patented Feb. 9, 1915.
2 SHEETS—SHEET 2.
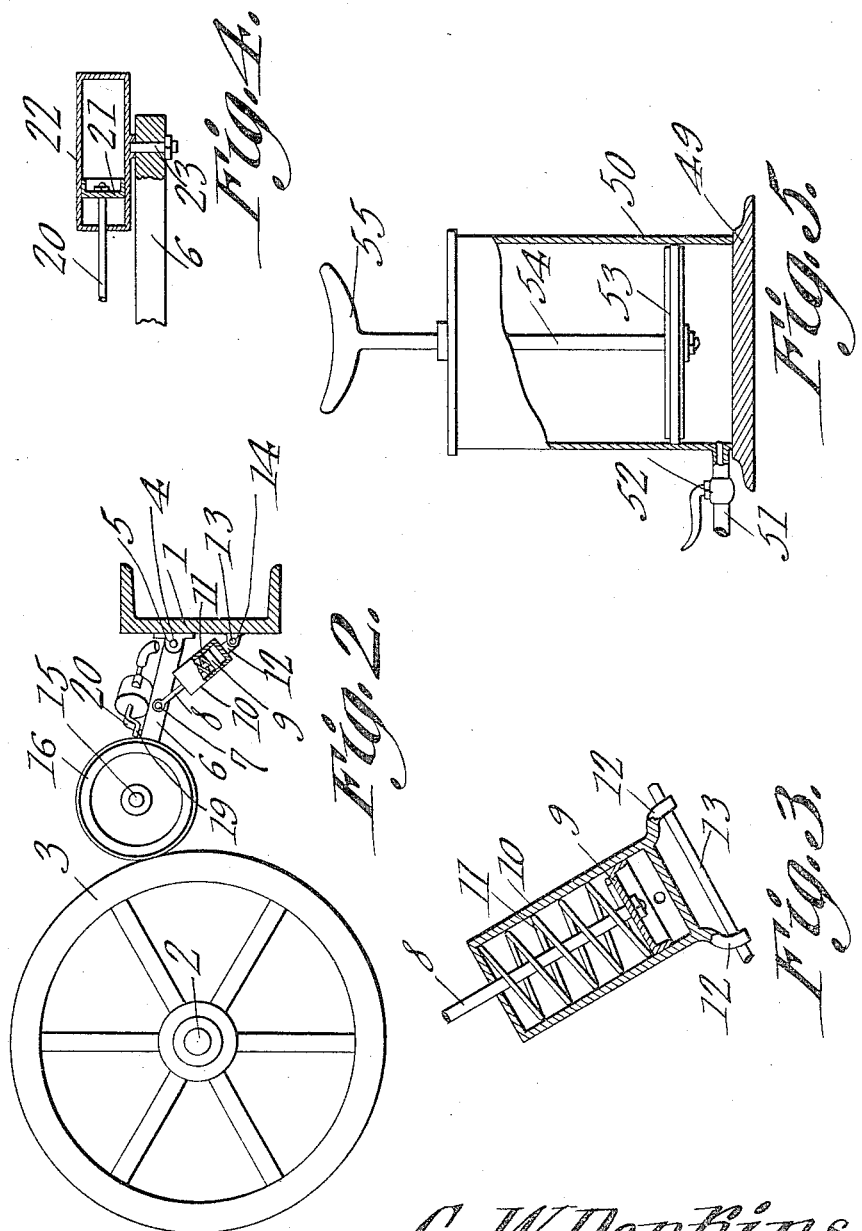
G. W. Dopkins,
Inventor
by [signature],
Attorneys
Witnesses
[signatures]

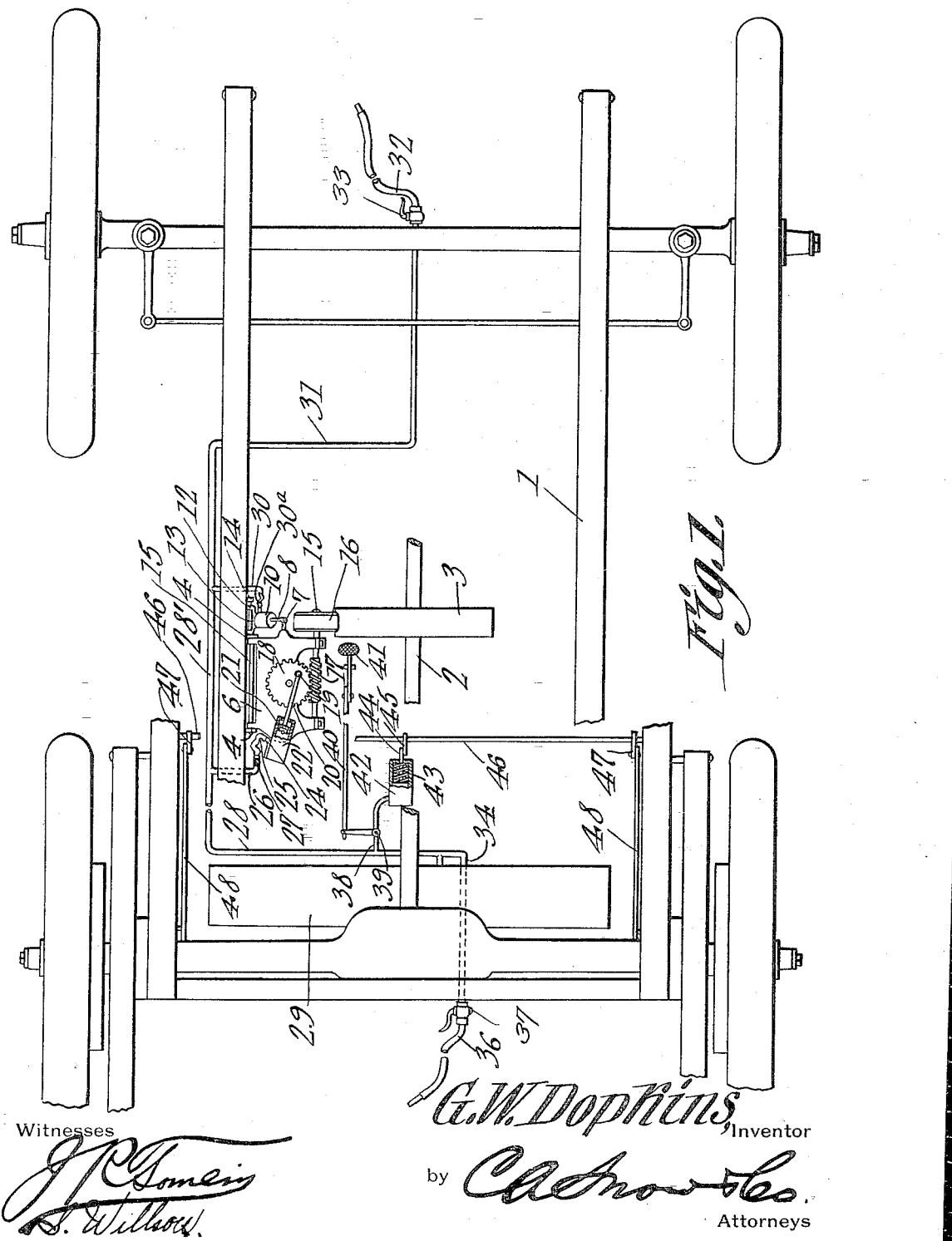

UNITED STATES PATENT OFFICE.

GEORGE W. DOPKINS, OF MORRIS, MINNESOTA.

PUMPING MECHANISM.

1,127,742.  Specification of Letters Patent.  Patented Feb. 9, 1915.

Application filed March 26, 1914. Serial No. 827,446.

*To all whom it may concern:*

Be it known that I, GEORGE W. DOPKINS, a citizen of the United States, residing at Morris, in the county of Stevens and State of Minnesota, have invented a new and useful Pumping Mechanism, of which the following is a specification.

The present invention relates to improvements in pumping mechanism, one object of the invention, being the provision of an air compressing mechanism controlled due to the pressure within the tank for movement into and out of engagement with the fly wheel of the explosion engine, thereby insuring the proper amount of air stored for operating air brakes, pumping pneumatic tires and operating a pneumatic jack.

A further object of the present invention, is the provision of a novel mounting of compressor mechanism to the frame or chassis of a motor car, whereby the same will be swung into and out of engagement with the fly wheel of an explosion engine, there being provided a pneumatic actuated means operable from the compressed air tank and due to a predetermined amount of pressure therein for moving the frame away from the fly wheel or permitting the frame to move downwardly in engagement with the fly wheel.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top diagrammatic view of a motor car chassis with the present invention in operable relation thereto, portions of the same being broken away and other portions being shown in section. Fig. 2 is an enlarged detail view taken from the front of the fly wheel showing the compressor mechanism in operable relation thereto. Fig. 3 is an enlarged detail sectional view of the compressor actuated means for controlling the position of the compressor mechanism relative to the fly wheel. Fig. 4 is an enlarged detail sectional view showing the connection of the compressing cylinder to the carrying frame. Fig. 5 is an enlarged detail view of a pneumatic jack structure used in connection with the present compressed air system.

Referring to the drawings, and particularly to Fig. 1, the numeral 1 designates the frame or chassis of the motor car, and 2 indicates the crank shaft of the explosion engine (not shown). A fly wheel 3 is operably connected to the crank shaft as usual. Two pivoting ears or lugs 4 are carried by one side of the frame upon the inner face thereof, and as particularly shown in Figs. 1 and 2, a rod 5 forming the hinging means between the lugs 4 and the frame 6, said frame being so disposed as to be normally held in a plane above that of the crank shaft, there being provided a pin 7 which is operably connected to the piston rod 8 of the piston 9 which is mounted for reciprocation within the cylinder 10, said piston 9 being moved inwardly due to the spring 11 so that the frame 6 will be held downwardly, the purpose of which will presently appear. The cylinder 10 is also swingingly connected by means of the apertured lugs 12 and the rod 13 to the lugs 14 of the frame 1. Thus when the cylinder 9 is pneumatically actuated as will presently appear, the same will be propelled against the action of the spring 11 and will elevate the frame 6 and the parts carried thereby, the decrease of air pressure permitting the spring 11 to operate the piston 9 and consequently permit the frame 6 to have its free end moved downwardly.

A shaft 15 is journaled in the outer free end of the frame 6, and fixed thereupon is a friction wheel 16, which is disposed to be moved into and out of engagement with the periphery of the fly wheel 3, the same when in engagement with the periphery of the fly wheel 3 being rotated so as to operate the worm gear 17 and through the meshing gear 18 thereof also journaled upon the frame 6, operate the gear 18 and through the eccentric pin 19, the piston rod 20. Thus the plunger 21 within the cylinder 22 will be reciprocated and as this plunger 21 and the cylinder 22 constitute the air compressor, air is properly compressed thereby, the pivoting pin 23 being a means to swingingly connect the cylinder 22 to the frame 6, so that the frame will oscillate as the gear 18 is rotated and the proper reciprocating action is imparted to the plunger 21.

A pipe 24 is led from the cylinder 22, and by means of the flexible connection 25 is connected to the pipe 26, there being disposed in the pipe 26 a check valve 27. This pipe 26 leads to the pipe 28 and consequently the compressed air is supplied to the storage tank 29. Thus, when the friction wheel 16 is in contact with the rotating fly wheel 3, air is being compressed by the compressor 22 and is supplied to the reservoir or tank 29. In order to provide a means for conveying the air to the cylinder 10, so that when a predetermined pressure has been stored in the tank 29, the wheel 16 will be moved upwardly and out of engagement with the fly wheel 3, the extension 28' of the pipe 28 is in communication with the cylinder 10 through the pipe 30 and the flexible connection 30ª. Also in communication with the extension 28' is a pipe 31, which carries the hose connection 32 with the valve 33, this being provided so that the forward tires of the motor car may be inflated when found necessary.

Leading from the pipe 28 adjacent the tank or reservoir 29, is a pipe 34, which through the flexible or hose connection 36 and the valve 37 provides a means for directing the air and the pressure to pump the rear tires of the automobile. By this means, the air in the tank 29 may be employed to inflate the tires. In order that the air may also be employed to operate brakes upon the car, a pipe 38 is led from the pipe 28 and is controlled by the valve 39, said valve 39 being controlled manually through the link 40 and the foot lever 41 so that the air may be directed from the tank 29 into the cylinder 42 to propel the piston or plunger 43 and through its rod 44 and the arm 45, rock the shaft 46. This shaft 46 is provided with the two arms 47 which through the rods or links 48 extend rearwardly to actuate brake bands (not shown) to control the rear wheels. In order to further provide a means for utilizing the compressed air stored within the tank 29, the jack structure shown in Fig. 5 is employed, the same consisting of the base 49 and the closed cylinder 50, which has led therefrom, the pipe 51 having the manually controlled valve 52, this pipe 51 being adapted to be connected to either one of the valve connections 33 or 37 so that air may be supplied from the tank 29 into the cylinder 50 to elevate the plunger 53 and its stem 54 which upon its free end is provided with the axle engaging member 55. Thus it will be seen that the motor car may be jacked by utilizing the present structure in connection with the compressed air stored in the tank 29.

What is claimed is:

1. An automatic pumping machine, including a support, a frame swingingly attached to the support, a swingingly mounted pneumatic cylinder also connected to the support at one side of the frame, a plunger mounted therein and pivotally connected to one side of the frame for swinging the frame, a spring for operating the plunger in opposition to the air pressure, and a pumping machine bodily carried by the frame and operably connected to the pneumatic cylinder.

2. An automatic pumping machine, including a support, a frame swingingly attached to the support, a swingingly mounted pneumatic cylinder also connected to the support at one side of the frame, a plunger mounted therein and pivotally connected to one side of the frame for swinging the frame, a spring for operating the plunger in opposition to the air pressure, a reciprocatory pump having its cylinder pivoted to one side of the frame for swinging movement, a gear journaled in the frame, the piston rod of the pump being connected to the gear, and a power driven gear journaled in the frame and operably engaging the first gear.

In testimony that I claim the foregoing as my own, I have hereto affixed my signature in the presence of two witnesses.

GEORGE W. DOPKINS.

Witnesses:
W. F. COOLEY,
W. F. COOLEY, Jr.

Copies of this patent may be obtained for five cents each, by addressing the "Commissioner of Patents, Washington, D. C."